US012761537B2

(12) United States Patent
Thomas

(10) Patent No.: US 12,761,537 B2
(45) Date of Patent: Oct. 13, 2026

(54) CAMERA GIMBAL

(71) Applicant: Kevin Thomas, Langhorne, PA (US)

(72) Inventor: Kevin Thomas, Langhorne, PA (US)

( * ) Notice: Subject to any disclaimer, the term of this patent is extended or adjusted under 35 U.S.C. 154(b) by 198 days.

(21) Appl. No.: 18/911,464

(22) Filed: Oct. 10, 2024

(65) Prior Publication Data

US 2026/0104629 A1 Apr. 16, 2026

(51) Int. Cl.

*G03B 17/56* (2021.01)
*F16M 11/04* (2006.01)
*F16M 11/20* (2006.01)
*F16M 13/04* (2006.01)

(52) U.S. Cl.

CPC ......... *G03B 17/561* (2013.01); *F16M 11/041* (2013.01); *F16M 11/046* (2013.01); *F16M 11/2021* (2013.01); *F16M 13/04* (2013.01)

(58) Field of Classification Search

CPC ............................ F16M 11/123; G03B 17/561
See application file for complete search history.

(56) References Cited

U.S. PATENT DOCUMENTS 4,017,168 A 4/1977 Brown
4,318,522 A 3/1982 Appleberry
4,886,230 A 12/1989 Jones et al.
5,098,182 A 3/1992 Brown
5,135,196 A 8/1992 Schehr
5,366,193 A 11/1994 Lindsay
5,737,657 A 4/1998 Paddock et al.
7,090,416 B2 8/2006 Mootz et al.
7,475,613 B2 1/2009 Bailey
7,588,376 B2 * 9/2009 Friedrich ............... F16M 11/08 396/419
8,029,197 B2 10/2011 McKay
8,714,744 B2 5/2014 Greaves et al.
9,201,292 B1 12/2015 Folgarelli
9,874,308 B2 1/2018 Saika et al.
9,904,149 B2 2/2018 Casarez et al.
10,844,998 B2 11/2020 Thomas
11,372,318 B2 6/2022 Thomas
11,720,004 B2 * 8/2023 Teichman ............ G03B 17/561 396/428
2002/0090216 A1 7/2002 Melitopoulos
2005/0135874 A1 6/2005 Baylis et al.
2005/0196163 A1 9/2005 Mootz et al.
2006/0231700 A1 10/2006 Orf et al.
2006/0262274 A1 11/2006 Brown et al.
2007/0155228 A1 7/2007 Nama et al.

(Continued)

FOREIGN PATENT DOCUMENTS

CN 203131349 U * 8/2013

*Primary Examiner* — Leon W Rhodes, Jr.
(74) *Attorney, Agent, or Firm* — Howson & Howson LLP

(57) ABSTRACT

A camera gimbal is provided having a gearbox with a gear secured to a bearing shaft and a rotary damper engaged with the gear in a manner permitting rotation of the rotary damper about a periphery of the gear and about an axis of rotation extending longitudinally through the bearing shaft and the gear. The camera gimbal including a clamp member to which the bearing shaft is secured such that rotation of the rotary damper about the gear results in relative rotation of the gearbox relative to the clamp member. The camera gimbal is purely-mechanical in operation and is without connection to a power source.

18 Claims, 14 Drawing Sheets

(56) References Cited

U.S. PATENT DOCUMENTS

| | | | |
|---|---|---|---|
| 2009/0003822 | A1 | 1/2009 | Tyner |
| 2011/0080563 | A1 | 4/2011 | Greaves et al. |
| 2012/0081670 | A1 | 4/2012 | Greaves et al. |
| 2013/0236167 | A1 | 9/2013 | Tardieu |
| 2017/0064176 | A1 | 3/2017 | Kim |
| 2017/0163896 | A1 | 6/2017 | Kang et al. |
| 2018/0266621 | A1 | 9/2018 | Zhang et al. |
| 2019/0368654 | A1 | 12/2019 | Thomas |
| 2021/0033950 | A1 | 2/2021 | Thomas |

* cited by examiner

CAMERA GIMBAL

BACKGROUND

The present invention relates to a camera gimbal, and components thereof, for stabilizing videography footage.

Shaky or blurred images are often produced by a camera held or secured to a moving person or object as the movement of the person or object is necessarily transmitted to the camera. For example, a digital camera, a smartphone having a camera, or like electronic device may be held by a user performing an activity (i.e., skateboarding, bicycling, skiing, or other activity) or may be mounted to an object in motion (i.e., a helmet, handlebar, vehicle, etc.). As a result, the motion may affect the quality of the media captured by the camera, causing blurry pictures, shaky footage, or other low-quality media. This can also result when repositioning a camera secured to a tripod.

In an effort to avoid the above referenced problem, a videographer may secure their camera to a camera gimbal, which is a device that can manipulate the orientation of the camera so as to correct for movement and to reduce the shakiness of handheld footage with the goal of providing clean and smooth footage output. Thus, the use of a camera gimbal provides a camera stabilization technique that can reduce the effects of motion on images, particularly video, recorded by the camera.

Consumers may own different types of cameras having different characteristics such as size, weight, shape, and the like. For instance, a consumer may have a relatively flat, thin, rectangular, relatively lightweight smartphone with a camera and may also have one or more relatively larger and/or heavier digital cameras of a significantly different shape. A camera gimbal is typically designed to support and mount only a particular type of camera in a balanced manner which takes into account only a limited range of size, weight, and shape of camera.

SUMMARY

According to an embodiment, a camera gimbal is provided. The camera gimbal includes a gearbox having a gear secured to a bearing shaft and a rotary damper engaged with the gear in a manner permitting rotation of the rotary damper about a periphery of the gear and about an axis of rotation extending longitudinally through the bearing shaft and the gear. The camera gimbal including a clamp member to which the bearing shaft is secured such that rotation of the rotary damper about the gear results in relative rotation of the gearbox relative to the clamp member. The camera gimbal is purely-mechanical in operation and is without connection to a power source.

BRIEF DESCRIPTION OF THE DRAWINGS

The foregoing and other objects, features and advantages of the embodiments disclosed herein should become apparent from the following description when taken in conjunction with the accompanying drawings.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments, a camera gimbal is provided that ensures smooth and stable movement of a camera, smartphone, or other electronic device mounted therein. For purposes of this disclosure, the term "camera" shall apply to all devices capable of taking video including digital cameras, smartphones, and the like electronic recording or streaming devices. Such cameras may include relatively small, compact, lightweight cameras for capturing photos and/or videos during surfing or other extreme action activity, in addition to more casual uses. Such cameras also include digital cameras that are typically larger and heavier and of a much bulker shape.

The camera gimbal may be mounted on the end of an elongate portable pole or handle or like equipment held, attached to, or controlled by a person in motion or in a stationary position. The camera gimbal of embodiments disclosed herein comprises at least one purely mechanical gearbox defining at least one rotational axis and set to automatically control the speed of rotation of the camera about the axis. Thus, the camera gimbal described herein is not a powered gimbal and relies solely on actions of mechanical components in response to forces of gravity and other forces. There are no electronic components. The resistance of at least one rotary gear or other energy-absorbing mechanism in the gearbox eliminates or reduces vibrations of the camera as it is moved while the camera captures video and/or still images.

According to embodiments, the camera gimbal may permit ready adjustment of a relative height of the camera as mounted on the camera gimbal such that the center of gravity of the camera may be positioned closer to or further away from the rotational axis defined by the camera gimbal. When mounted closer to the rotational axis of the camera gimbal, this will cause the camera gimbal to rotate at a decreased speed, whereas the opposite is true if the center of gravity of the camera is positioned further from the rotational axis. Further, the camera gimbal has adjustment means for providing center balance of the camera relative to the rotational axis of the camera gimbal to correct for a camera having an offset center of gravity as mounted to the camera gimbal. Finally, the camera gimbal of embodiments disclosed herein provides great versatility with respect to attachment of various standard mount hardware used in the photography industry.

Figure 15:
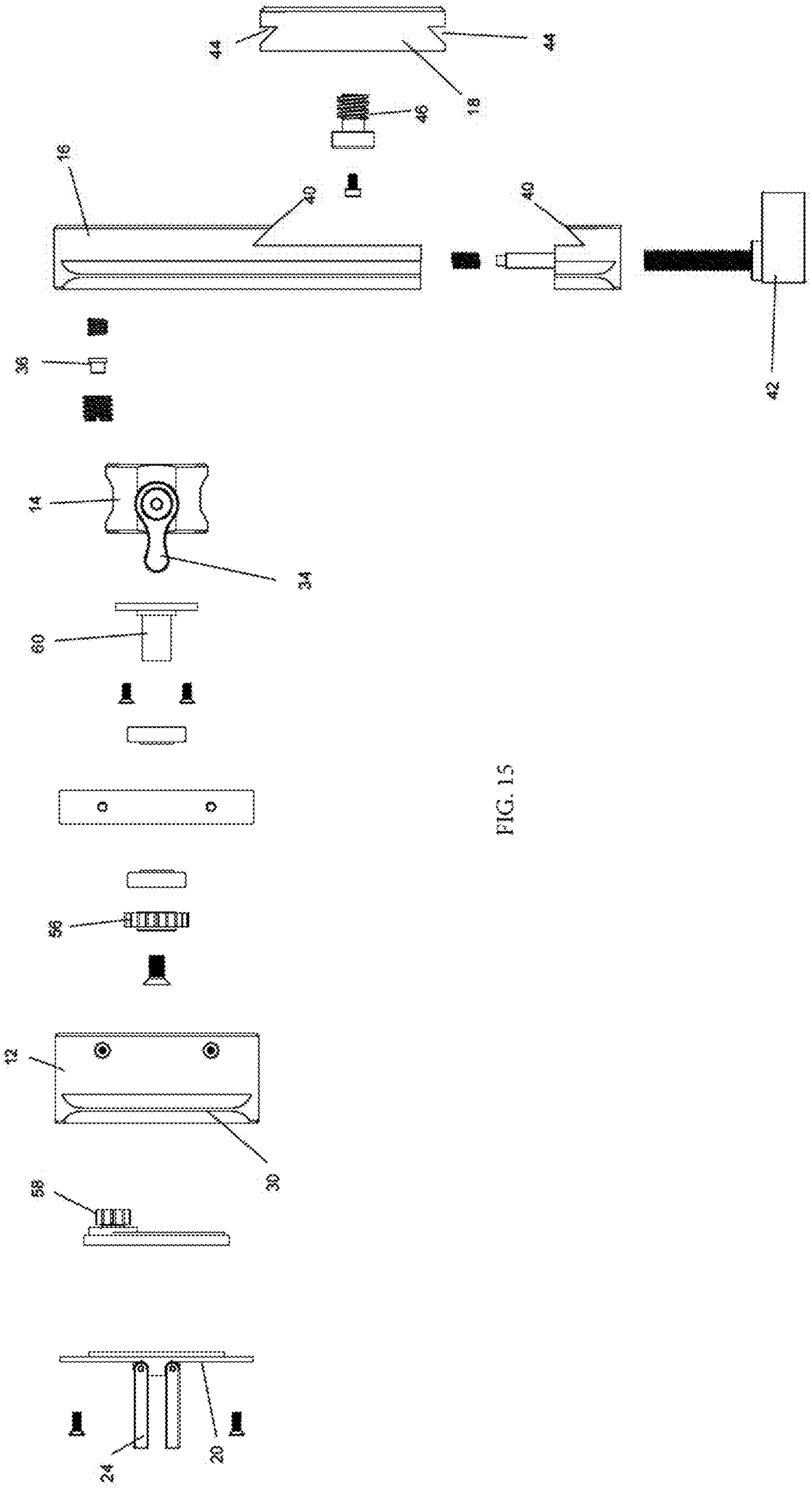
FIG. 15 is an exploded side elevational view of the camera gimbal of FIG. 1.
Figure 16:
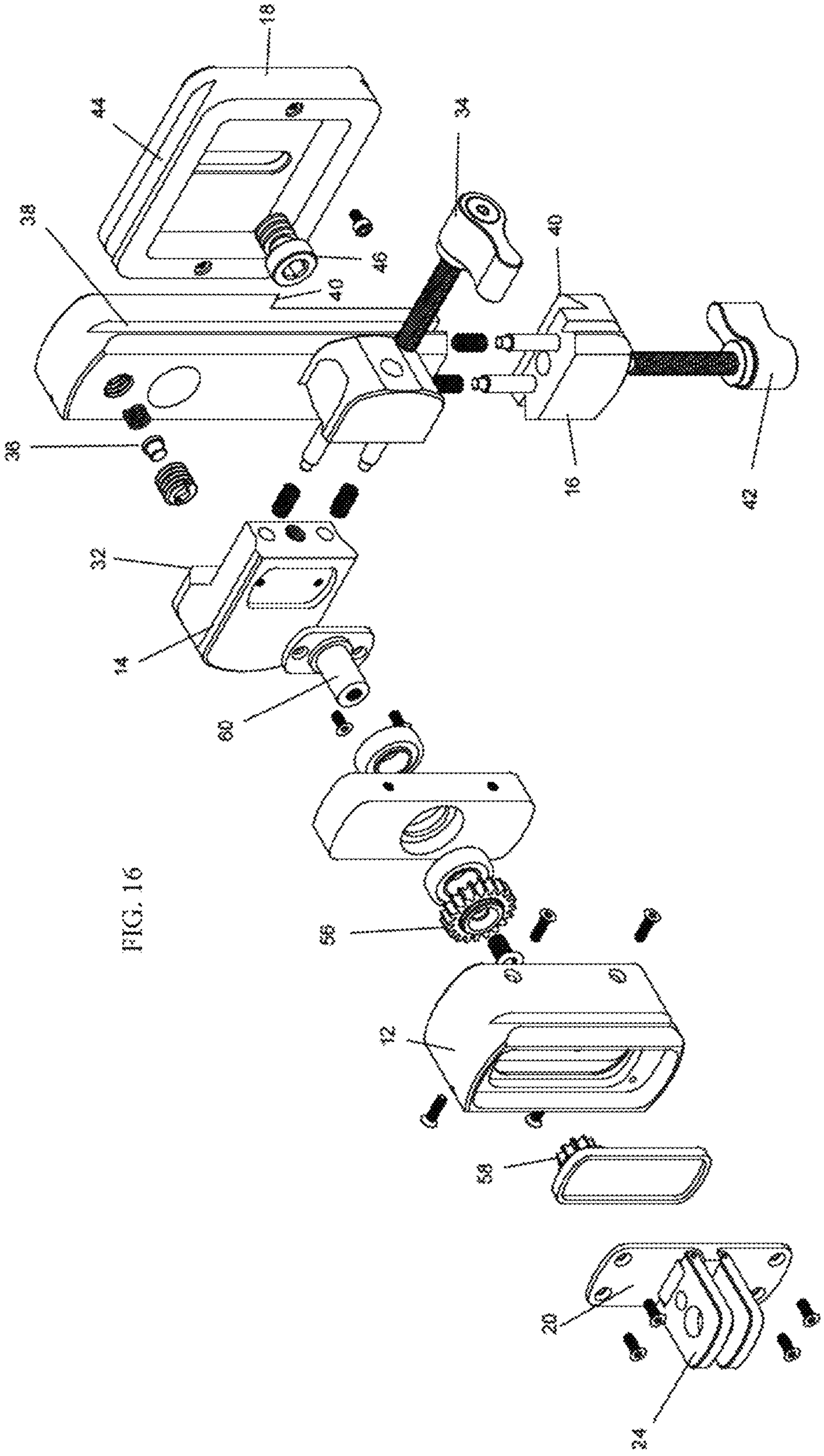
FIG. 16 is an exploded perspective view of the camera gimbal of FIG. 1.
Figure 17:
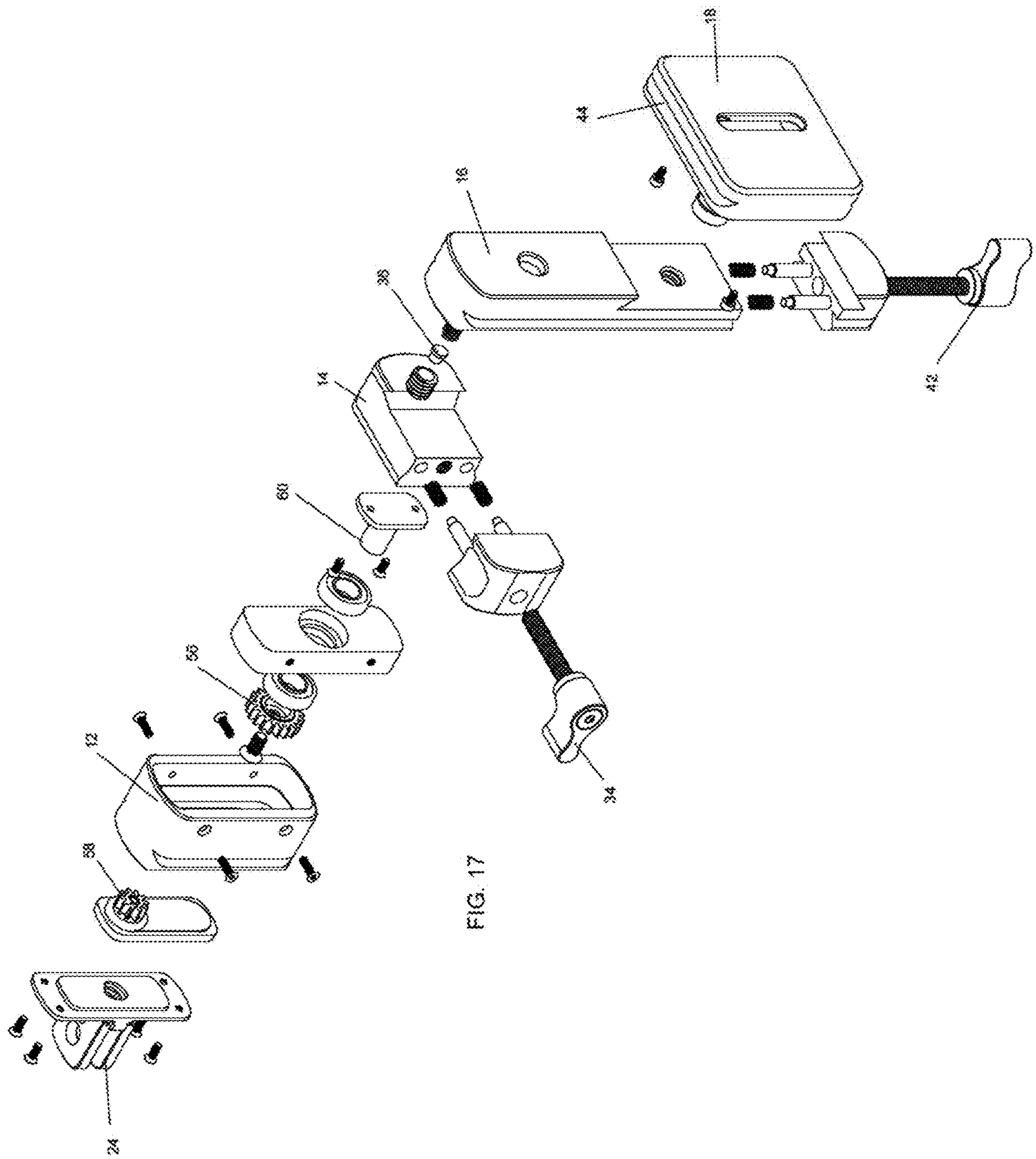
FIG. 17 is an exploded perspective view of the camera gimbal of FIG. 1.

Various basic components of a camera gimbal 10 according to an embodiment are shown in FIGS. 1-5. The basic components include a gearbox 12, a clamp member 14, a rail member 16, and a mounting plate 18. A pole, extension pole, or the like may be attached to a face 20 of the gearbox 12, and a camera or other mounting device may be connected to a face 22 of the plate 18. Exploded views of these components are illustrated in FIGS. 15-17.

The gearbox 12 houses a central main gear 56 through which an axis of rotation "A" is defined and at least one rotary damper 58, such as a hydraulic rotary damper gear or the like, engaged to the central gear 56 along a periphery thereof for traveling in a circular path about the periphery when the gearbox 12 rotates relative to the clamp member 14 about the axis of rotation "A". The specific rotary damper and/or the number of rotary dampers may be selected to produce desired damping affects (i.e., more or less damping).

The face 20 of the gearbox 12 includes a pair of deployable feet 24, a threaded socket 26, and a pair of locating holes 28. A standard mounting screw or fastener may be secured to the threaded socket 26 and the pair of locating holes 28 can accommodate locating pins which prevent rotation of the component secured to the threaded socket 26. As an example, the thread size of the mounting screw can be ¼-20 which is a standing mounting size used with components in the photography industry.

Opposite sides of the gearbox 12 may include grooves 30 to which other mounting hardware (i.e., clamps and the like) may be attached. The pair of feet 24 can be rotated outward to project from the face 20 to provide another option for mounting a component, such as an extension pole to the gearbox 12. As an example, a GOPRO pole can be mounted to the feet 24 when positioned outward of the face 20 (see FIG. 30, for an example).

A gear shaft 60 is secured to and extends from the clamp member 14 and secures the clamp member 14 to the main gear 56 of the gearbox 12. Thus, the clamp member 14 can rotate about the axis of rotation "A" extending through and defined by the gear shaft 60 relative to gearbox 12, and the rotary damper 58 within the gearbox 12 provides a desired amount of resistance or damping effect to the rotation. The teeth of the main gear 56 mesh with the teeth of the rotary damper 58.

The clamp member 14 includes a clamp so that other hardware may be mounted thereto. The clamp may be a NATO clamp that includes tapered edges 32 that may be received within grooves formed in the mating hardware, such as the rail member 16. The clamping member 14 may be a spring-loaded clamp and may include an external knob 34 that can be manually turned to tighten or loosen the clamp. For instance, loosening the clamp could cause the tapered edges 32 to move apart from each other and thereby expand the gap therebetween, and tightening the clamp could cause the tapered edges 32 to retract toward each other to shorten the gap therebetween. In addition, the knob 34 may be spring-loaded such that the direction the knob 34 extends may be repositioned, for instance, if it interferes with another component.

In one embodiment, the clamp member 14 is attached to a rail member 16, such as a NATO rail. The rail member 16 may be elongate and have opposed longitudinally-extending grooves 38 formed along sides thereof. Accordingly, the position of the clamp member 14 on the rail member 16 may be adjusted and secured in place at any location along the length of the rail member 16. The rail member may also include a spring pin 36 for preventing the rail member 16 from falling through the clamp member 14 when the clamp of the clamp member 14 is loosened to avoid an attached camera from being dropped.

The rail member 16 provides a clamp for the mounting plate 18. The rail member 16 and mounting plate 18 may be, for example, ARCA SWISS mounting hardware. In this case, the rail member 16 has an indentation defined by a pair of tapered edges 40 extending transverse to the grooves 38 and an external knob 42 for tightening or loosening the clamp.

The mounting plate 18 may have a set of grooves 44 along two opposed sides into which the tapered edges 40 of the rail member 16 may be extended to lock the mounting plate 18 to the rail member 16. The mounting plate 18 may include a mounting screw or fastener 46 to which a camera or other component may be connected. The position of the mounting plate 18 on the rail member 16 may be adjusted and secured in place at any location along the grooves 44 of the mounting plate 18. Thus, for instance, in FIG. 2, the position of the mounting plate 18 relative to the rail member 16 can be laterally adjusted to the right or the left.

According to the above described components, a camera can be mounted to the mounting plate 18 and the position of the mounting plate 18 relative to the rail member 16 can be adjusted such that the center of gravity of the camera may be aligned with a longitudinally extending central axis "B" of the rail member 16 that intersects the axis of rotation "A" of the camera gimbal 10. In addition, the location of the clamp member 14 on the rail member 16 can be adjusted to locate the camera closer or further from the clamp member 14. The closer the center of gravity of the camera is located relative to the axis of rotation "A", the greater the speed of rotation of the camera, and the further the center of gravity of the camera relative to the axis of rotation "A", the slower the speed of rotation of the camera. Thus, the action or properties of the camera gimbal 10 can be controlled based on these adjustments.

Figure 8:
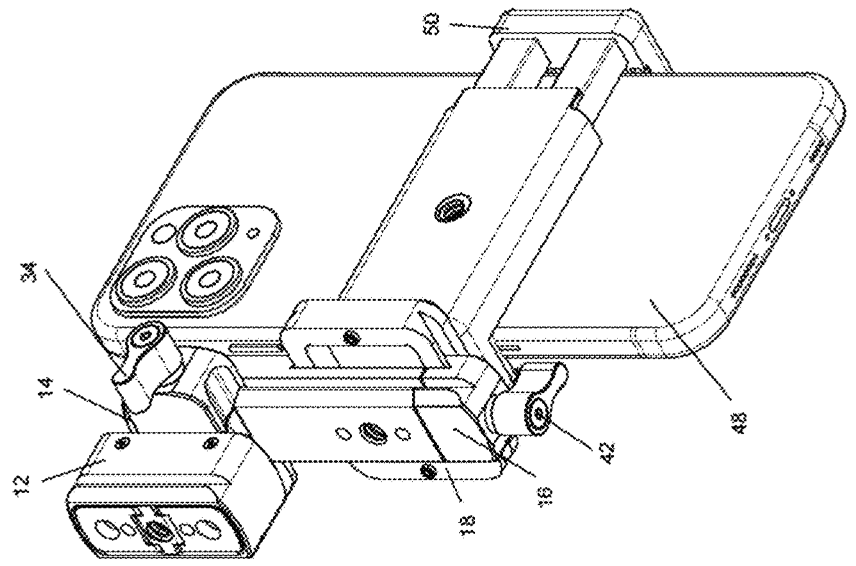
FIG. 8 is a perspective view of the smartphone and camera gimbal of FIG. 6.
Figure 7:
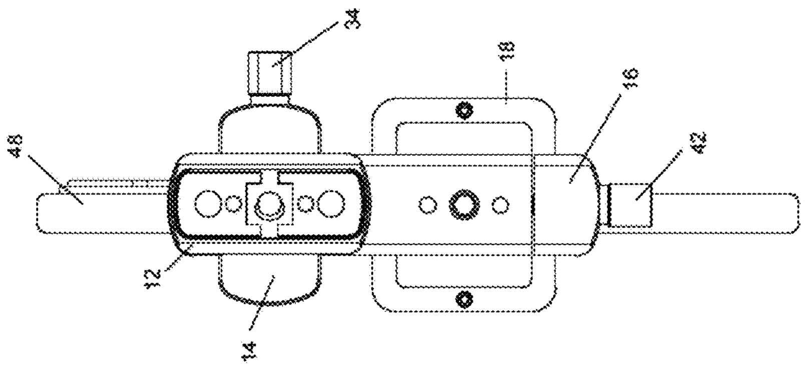
FIG. 7 is a rear elevational view of the smartphone and camera gimbal of FIG. 6.
Figure 6:
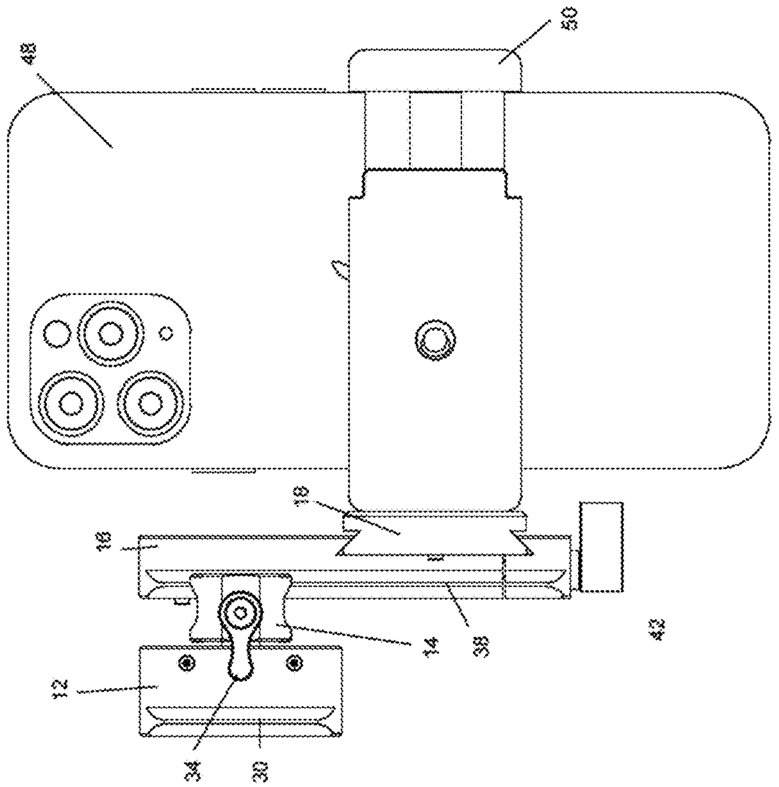
FIG. 6 is a side elevational view of a smartphone secured to the camera gimbal of FIG. 1.

FIGS. 6-8 provide an example of a smartphone 48 secured to the camera gimbal 10. A smartphone mounting clamp 50 is secured to the mounting plate 18 of the cameral gimbal 10. Typically, the connection will be via a standard mounting screw 46 and corresponding socket. Locating pins and holes may also be utilized to prevent rotation of the smartphone mounting clamp 48 relative to the mounting plate 18. The smartphone 48 is clamped and held by the smartphone mounting clamp 50. As shown in FIG. 7, the center of gravity of the smartphone 48 can be directly below the axis of rotation "A" of the camera gimbal 10 so that, when at rest, the camera lens of the smartphone 48 faces straight forward and camera is center balanced. Depending on how close the axis of rotation "A" of the camera gimbal 10 is to the center of gravity of the smartphone 48 will determine the rate of speed of the rotation of the smartphone 48.

Figure 11:
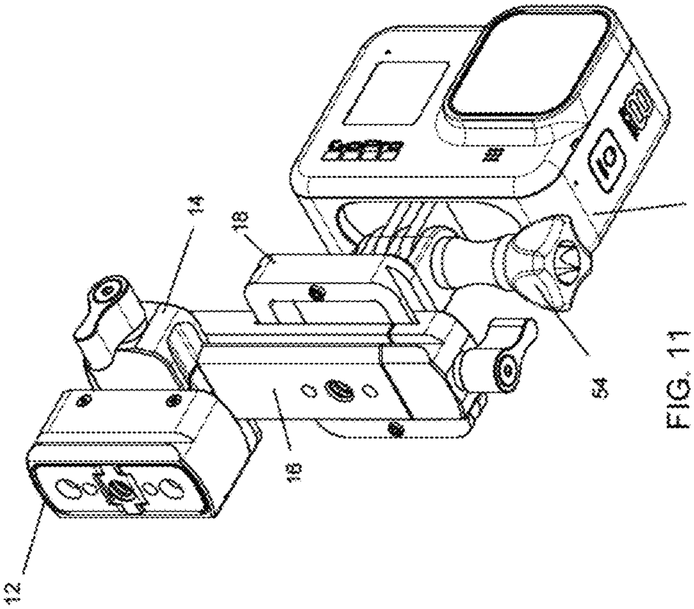
FIG. 11 is a perspective view of the relatively lightweight camera and camera gimbal of FIG. 9.
Figure 10:
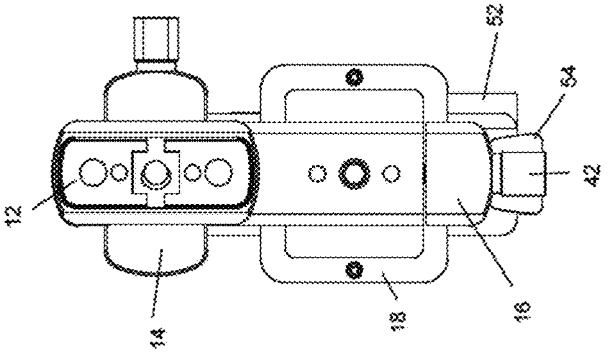
FIG. 10 is a rear elevational view of the relatively lightweight camera and camera gimbal of FIG. 9.
Figure 9:
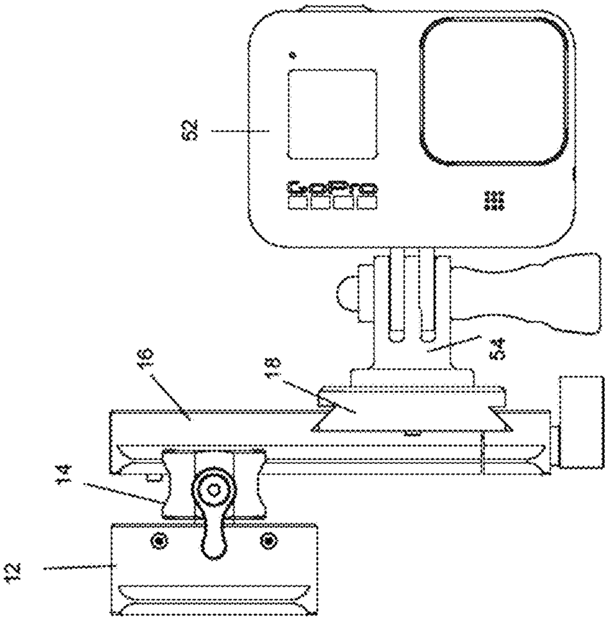
FIG. 9 is a side elevational view of a relatively lightweight camera secured to the camera gimbal of FIG. 1.

FIGS. 9-11 provide an example of a relatively lightweight camera 52, such as a GOPRO camera, secured to the camera gimbal 10. A camera mounting bracket 54 is secured to the mounting plate 18 and the camera 52 is secured to the mounting bracket 54. Alternatively, the camera 52 may be directly secured to the mounting plate 18. As before, the location of the center of gravity of the camera can be positioned such that the camera is upright and points straight forward and is center balanced. In addition, the speed of rotation can be adjusted by positioning the center of gravity of the camera closer or further away from the axis of rotation "A" of the camera gimbal 10.

Figure 14:
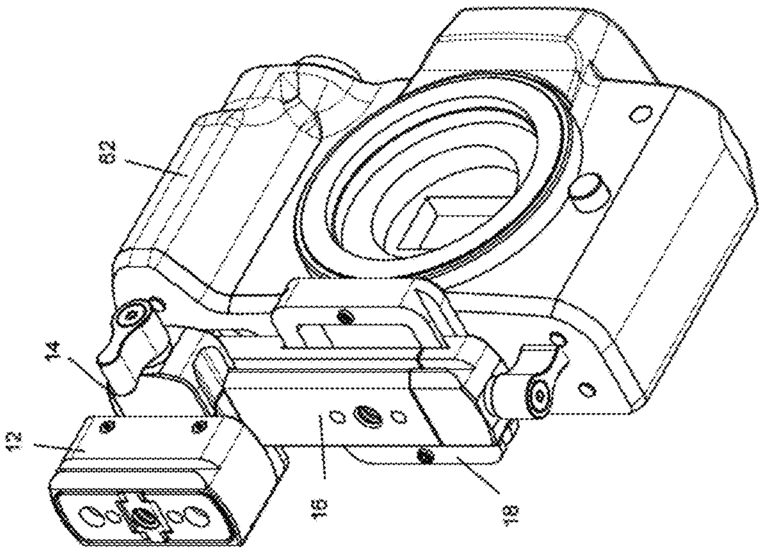
FIG. 14 is a perspective view of the relatively heavy camera and camera gimbal of FIG. 12.
Figure 13:
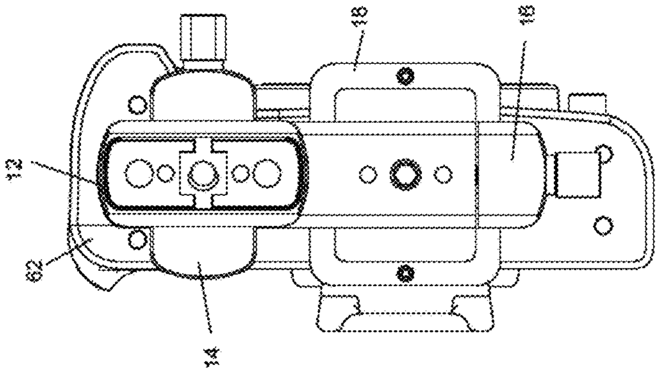
FIG. 13 is a rear elevational view of the relatively heavy camera and camera gimbal of FIG. 12.
Figure 12:
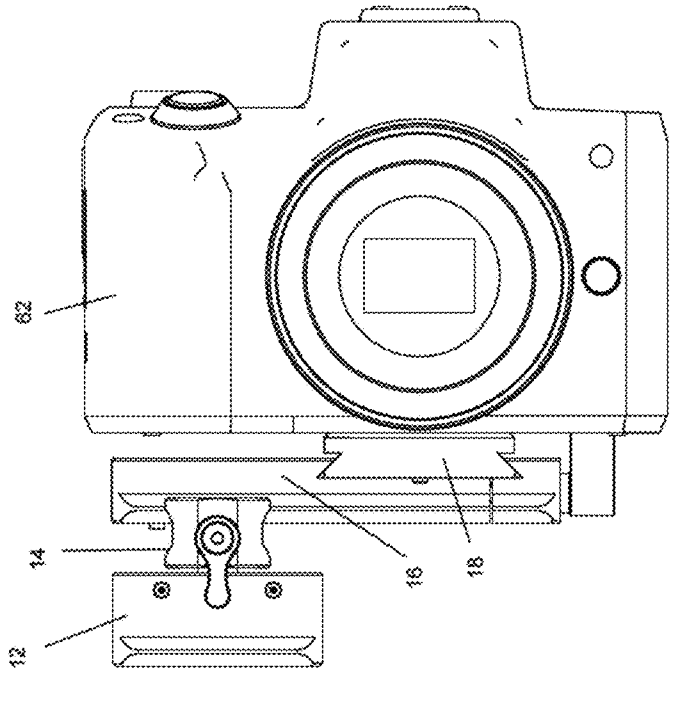
FIG. 12 is a side elevational view of a relatively heavy camera secured to the camera gimbal of FIG. 1.

FIGS. 12-14 provide an example of a relatively heavy and large camera 62, such as a DSLR camera, secured to the camera gimbal 10. The camera 62 may be secured directly to the mounting screw 46 of the mounting plate 18. Alternatively, a cage or like mounting component can mount the camera 62 to the mounting plate 18. As before, the location of the center of gravity of the camera 62 can be positioned such that the camera 62 is upright and points straight forward. In addition, the speed of rotation can be adjusted by positioning the camera 62 closer or further away from the axis of rotation "A" of the camera gimbal 10.

In any of the above referenced assemblies, the cameras can be connected in a vertical or horizontal orientations relative to the camera gimbal 10 depending upon the mounting hardware utilized. For instance, in a vertical orientation, the mounting screw 46 of the mounting plate 18 may be secured directly to a socket in the bottom of the camera. Alternatively, to secure the camera in a horizontal orientation relative to the camera gimbal 10, mounting hardware may be used to connect the camera to the mounting plate 18.

Figure 20:
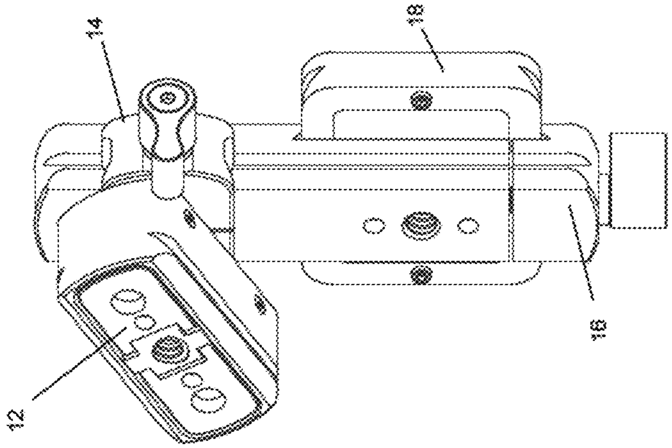
FIGS. 18-20 are perspective views of the camera gimbal of FIG. 1 showing rotation of the gearbox relative to the clamp member.
Figure 19:
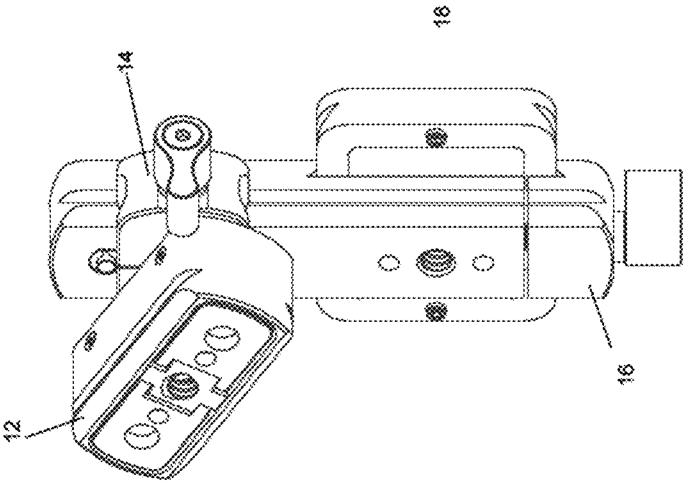
Figure 18:
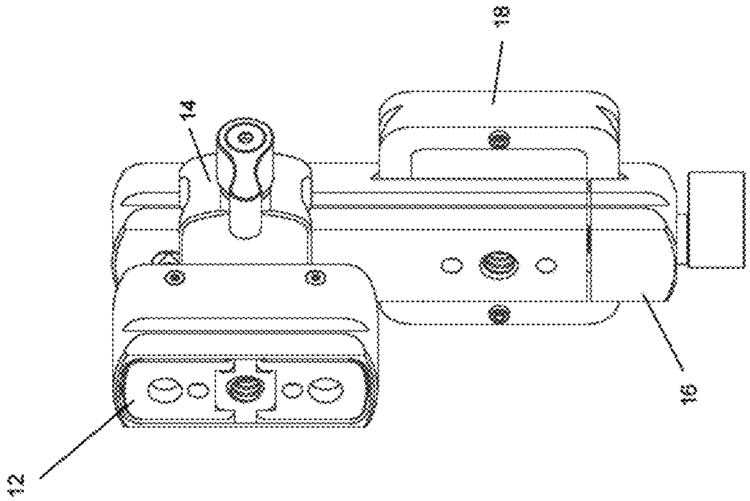

FIGS. 18-20 show the rotation of the gearbox 12 relative to the clamping member 14, for instance, during use of the camera gimbal 10. The camera will point forward in a stable manner while the gearbox 12 rotates relative to the clamping member 14.

Figure 3:
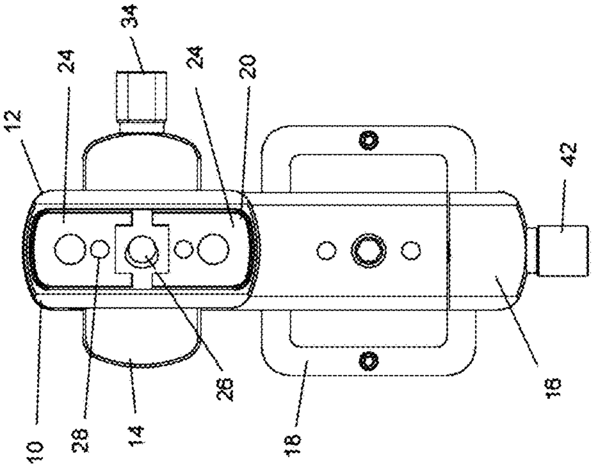
FIG. 3 is a rear elevational view of the camera gimbal of FIG. 1.
Figure 2:
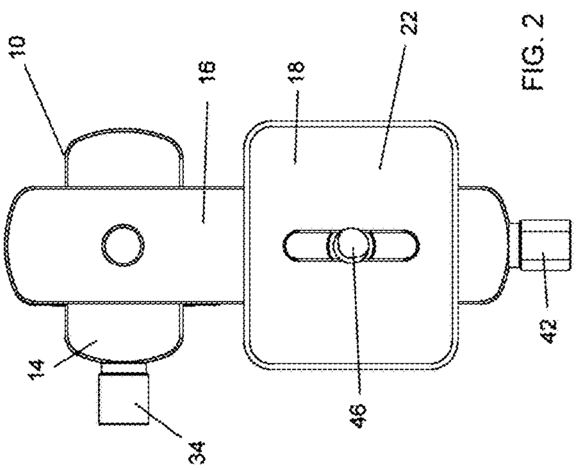
FIG. 2 is a front elevational view of the camera gimbal of FIG. 1.
Figure 5:
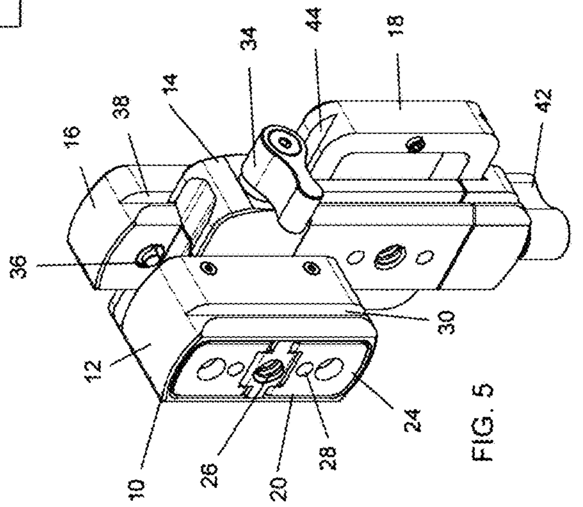
FIG. 5 is a perspective view of the camera gimbal of FIG. 1.
Figure 4:
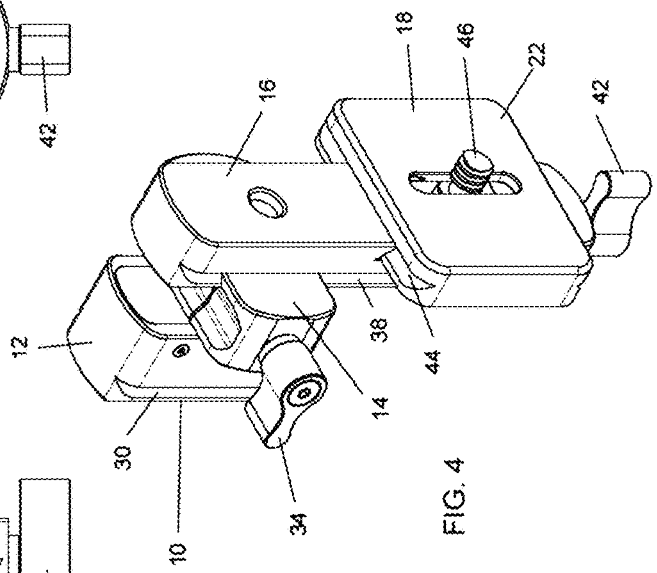
FIG. 4 is a perspective view of the camera gimbal of FIG. 1.
Figure 1:
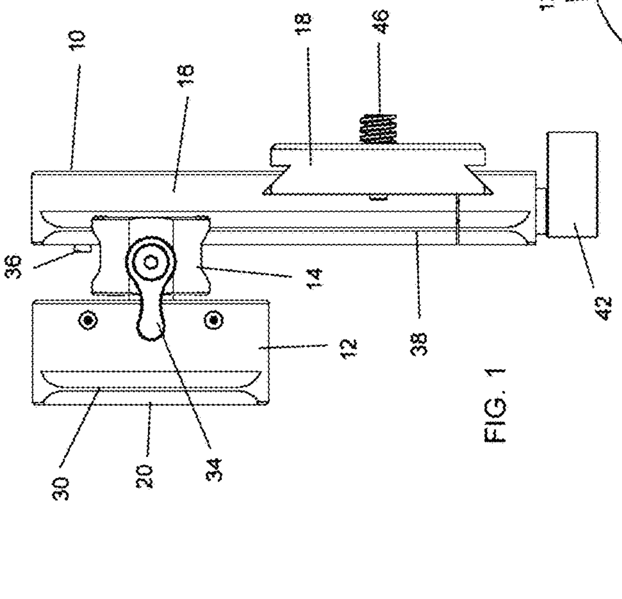
FIG. 1 is a side elevational view of a camera gimbal according to an embodiment.
Figure 22:
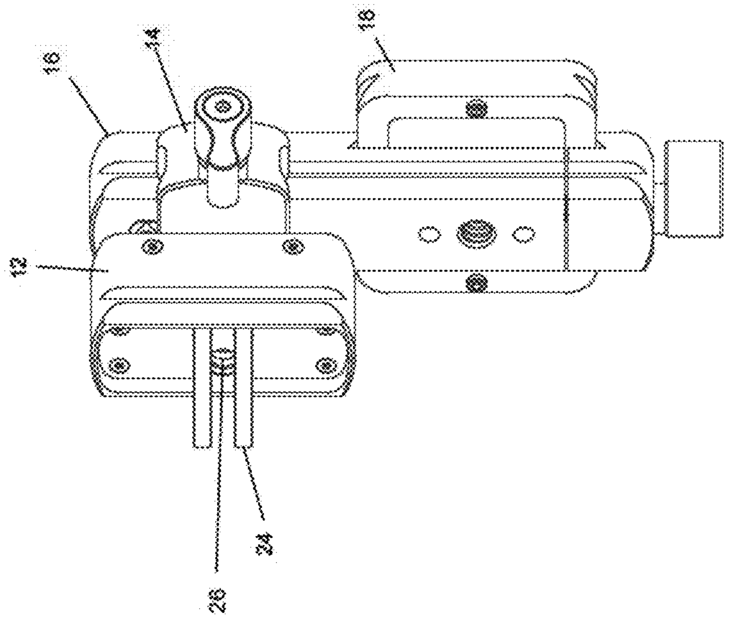
FIG. 22 is a perspective view of the camera gimbal of FIG. 1 in which the feet of the gearbox are in an extended position.
Figure 21:
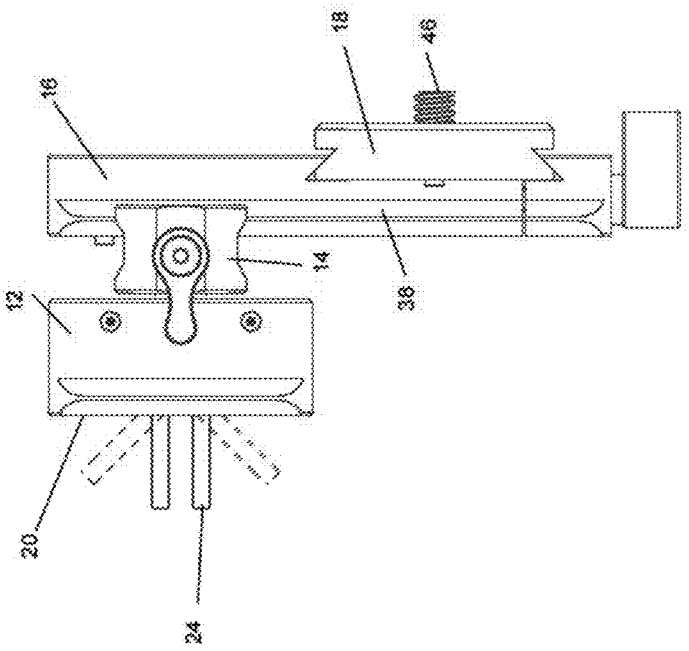
FIG. 21 is a side elevation view of the camera gimbal of FIG. 1 in which the feet of the gearbox are in an extended position.

FIGS. 21 and 22 show the feet 24 in an extended position relative to the face 20 of the gearbox. In this position, certain mounting hardware or poles may be secured to the feet 24. Alternatively, the feet 24 can be in a stowed position as best shown in FIGS. 1, 3 and 5.

Figure 25:
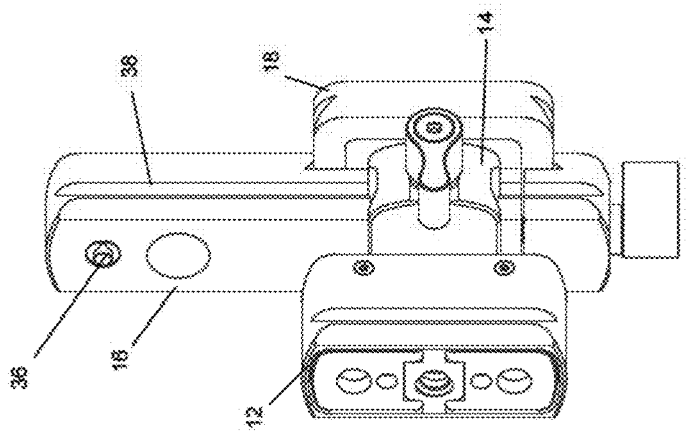
FIGS. 23-25 are perspective views of the clamping member of the camera gimbal positioned at different distances relative to the mounting plate.
Figure 24:
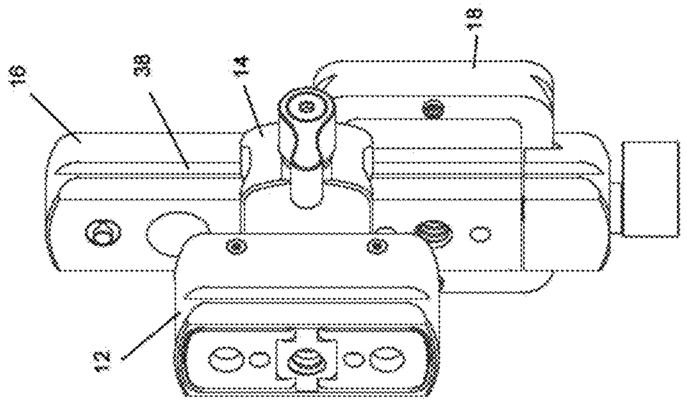
Figure 23:
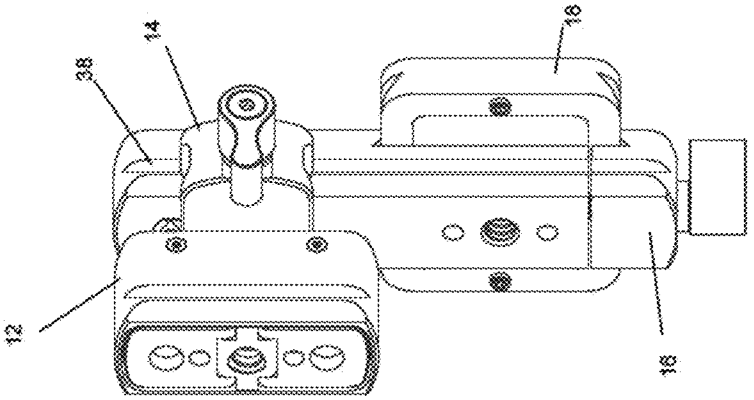
Figure 26:
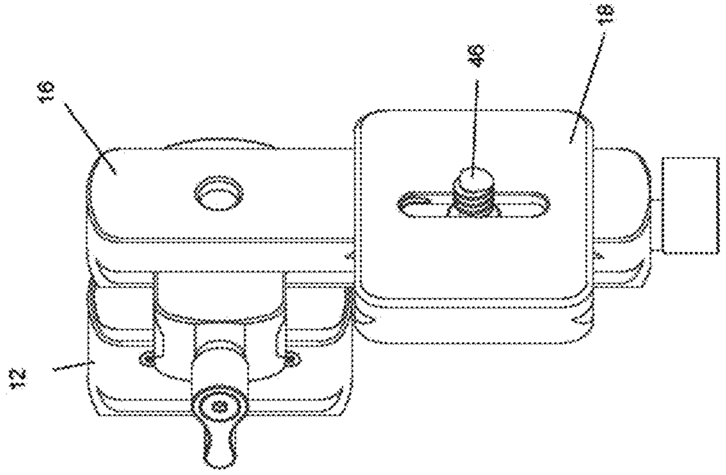

FIGS. 23-25 show different positions of the clamping member 14 as secured to the rail member 16. In FIG. 23, the clamping member 14 is spaced a relatively far distance from the mounting plate 18. In FIG. 25, the clamping member 14 is spaced a relatively close distance to the mounting plate 18, and FIG. 26 shows an intermediate position. A camera connected to the mounting plate 18 will rotate at different speeds depending upon the relative location of the clamping member 14 on the rail member 16. The arrangement shown in FIG. 23 should rotate faster than the arrangements shown in FIGS. 24 and 25, and the arrangement shown in FIG. 25 should rotate slower than the arrangements shown in FIGS. 23 and 24. In this manner, a user may assembly these components based on their desired results.

Figure 28:
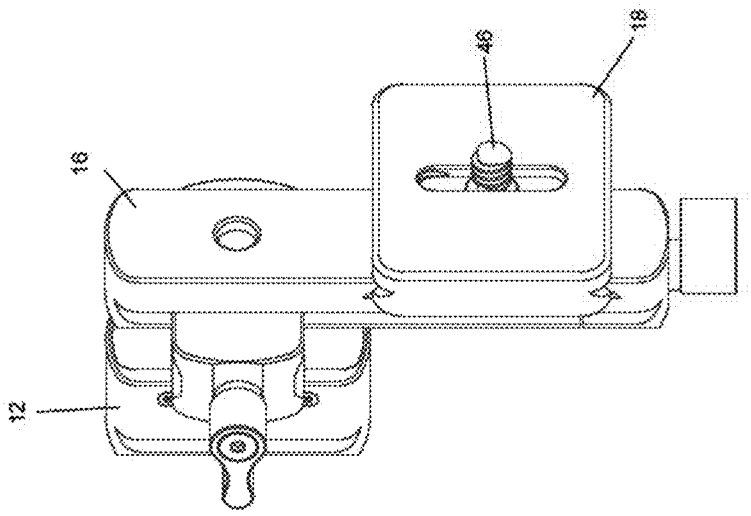
FIGS. 26-28 are perspective views of different lateral positioning of the mounting plate relative to the rail member of the camera gimbal.
Figure 27:
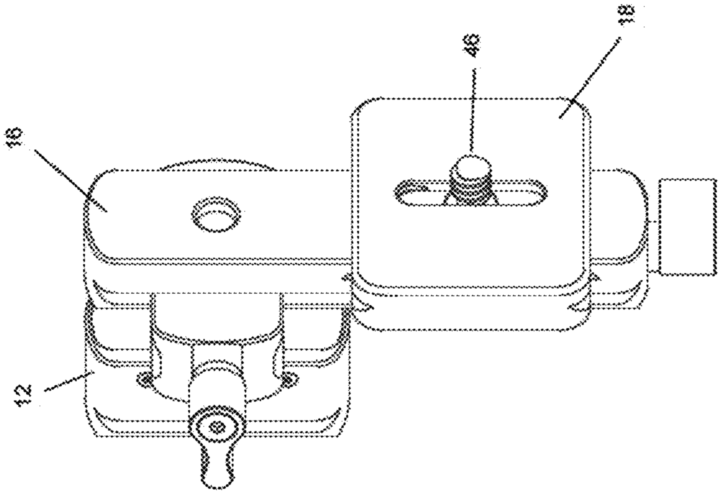

FIGS. 26-28 show different lateral positions of the mounting plate 18 secured to the rail member 16. In FIG. 26, the mounting plate 18 is offset to the left of the rail member 16. In FIG. 27, the mounting plate 18 is centered relative to the rail member 16. In FIG. 28, the mounting plate 18 is offset to the right of the rail member 16. Thus, the center of gravity of a camera may be centered relative to the central longitudinal axis "B" of the rail member 16, even if the center of gravity does not align with the physical center of the camera.

Figure 29:
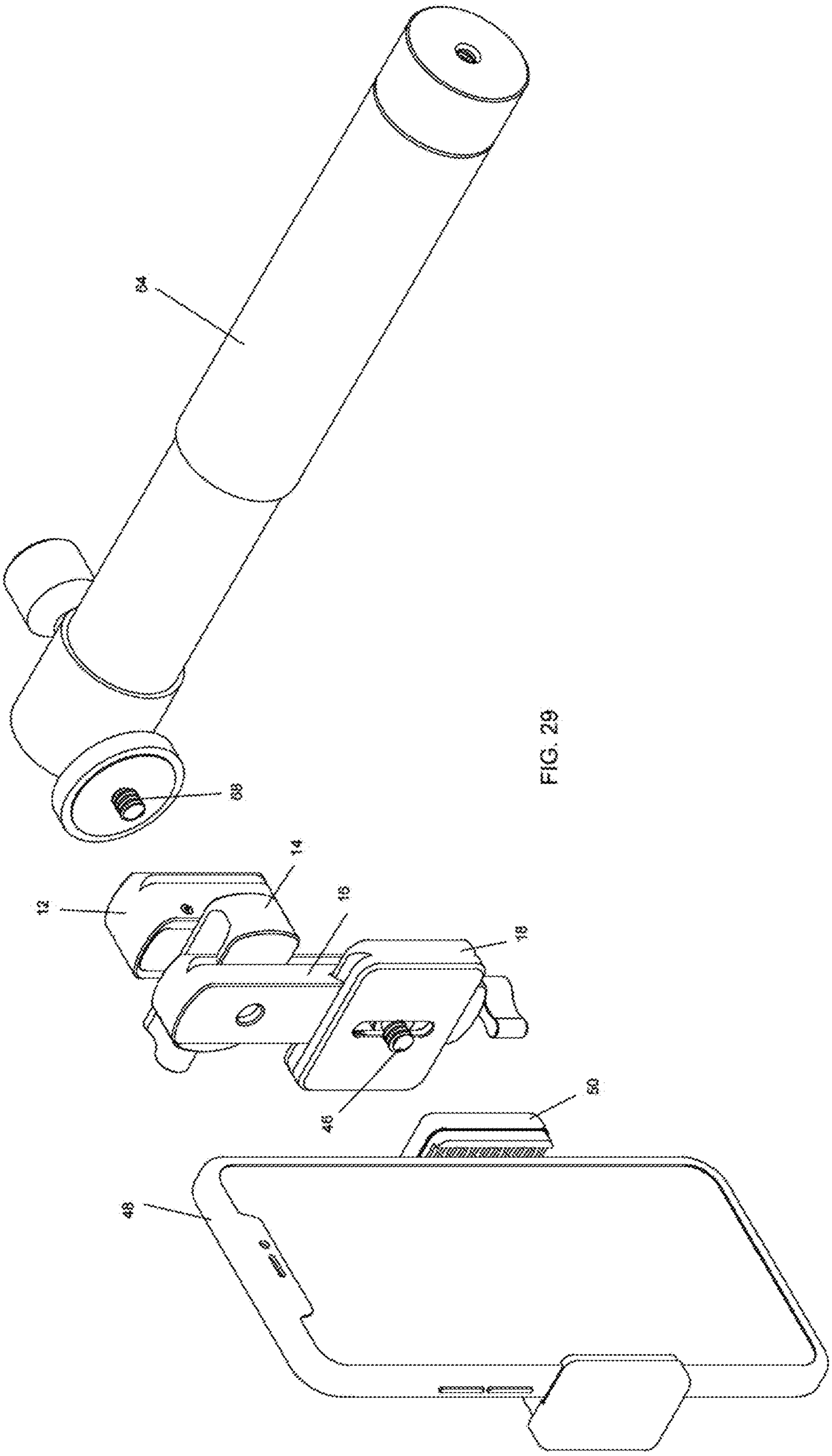
FIG. 29 is a perspective view of the camera gimbal of FIG. 1 adjacent a smartphone and extension pole to be assembled thereon.

FIG. 29 illustrates a potential assembly including the camera gimble 10 discussed above. The smartphone mounting clamp 50 to which the smartphone 48 is secured can be connected to the fastening screw 46 of the mounting plate 18. An extension pole 64 having a mounting screw 68 can be secured to the socket 26 in the face 20 of the gearbox 12 of the camera gimbal 10. In use, the user would grip the pole or attach the pole to a surface or the like and the camera should be supported in a stable manner even as the user performs various movements, such as movements on a skateboard, skis, bicycle, surfboard, or the like.

Figure 30:
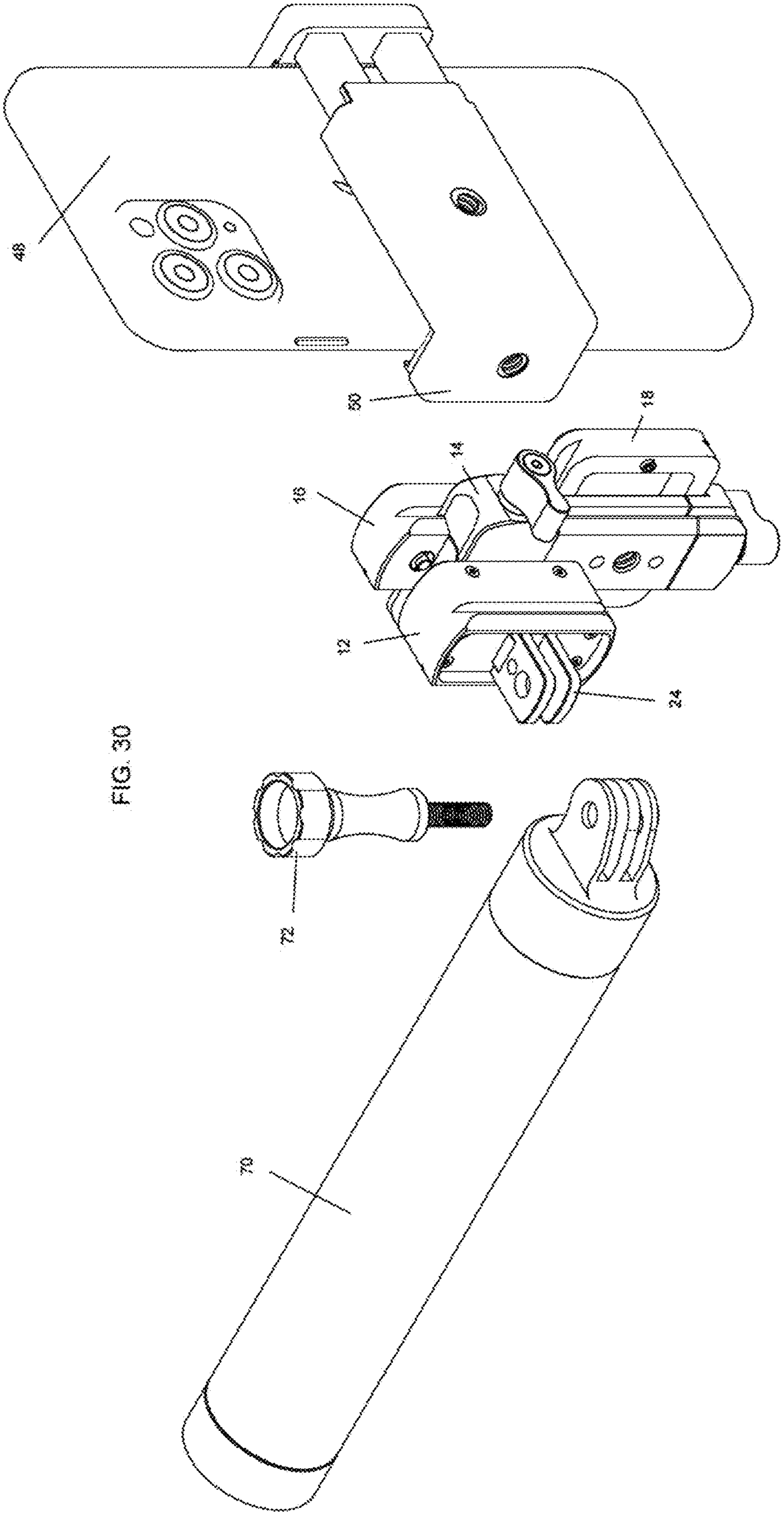
FIG. 30 is a perspective view of the camera gimbal of FIG. 1 adjacent a smartphone and alternate extension pole to be assembled thereon.

FIG. 30 illustrates a potential assembly including the camera gimble 10 discussed above. The smartphone mounting clamp 50 to which the smartphone 48 is secured can be connected to the fastening screw 46 of the mounting plate 18. An extension pole 70 having a fastener 72 can be secured to the extended feet 24 of the gearbox 12 of the camera gimbal 10. In use, the user would grip the pole or attach the pole to a surface or the like and the camera should be supported in a stable manner even as the user performs various movements, such as movements on a skateboard, skis, bicycle, surfboard, or the like.

Figure 31:
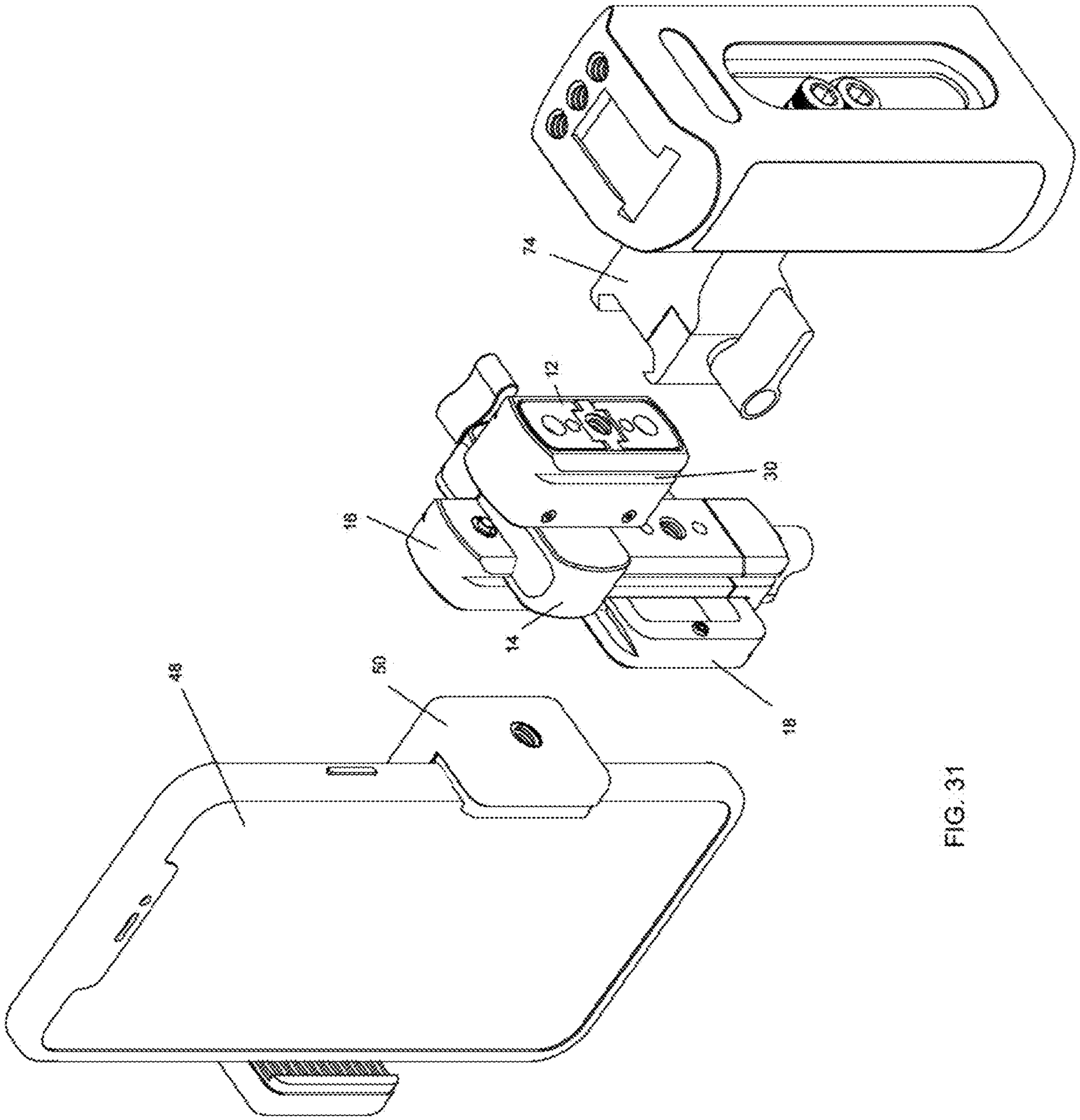
FIG. 31 is a perspective view of the camera gimbal of FIG. 1 adjacent a smartphone and a clamping device to be assembled thereon.

FIG. 31 illustrates a potential assembly including the camera gimble 10 discussed above. The smartphone mounting clamp 50 to which the smartphone 48 is secured can be connected to the fastening screw 46 of the mounting plate 18. A mounting hardware component 74 can be clamped to the grooves 30 on the sides of the gearbox 12. An extension pole having a mounting screw can be secured to a threaded socket in the bottom of the mounting hardware component. As an example, the mounting hardware component may be a NATO clamp or the like.

The various components described above may be made of metallic or non-metallic materials, resins, plastic, composite materials, or the like.

The above description illustrates an embodiment of how aspects of the present invention may be implemented, and are presented to illustrate the flexibility and advantages of particular embodiments as defined by the following claims, and should not be deemed to be the only embodiment. One of ordinary skill in the art will appreciate that based on the above disclosure and the following claims, other arrangements, embodiments, implementations, and equivalents may be employed without departing from the scope hereof as defined by the claims. Accordingly, the specification and figures are to be regarded in an illustrative rather than a restrictive sense, and all such modifications are intended to be included within the scope of the present invention. The present invention is defined solely by the appended claims and equivalents thereof.

I claim:

1. A camera gimbal, comprising:

a gearbox having a gear secured to a bearing shaft and a rotary damper engaged with said gear in a manner permitting rotation of said rotary damper about a periphery of said gear and about an axis of rotation extending longitudinally through said bearing shaft and said gear;

a clamp member to which the bearing shaft is secured such that rotation of the rotary damper about the gear results in relative rotation of the gearbox relative to the clamp member;

the camera gimbal being purely-mechanical in operation and is without connection to a power source;

wherein the gearbox has a plurality of different mounting structures to which a pole or mounting hardware may be attached.

2. The camera gimbal according to claim 1, wherein the gearbox includes a face, and wherein the plurality of different mounting structures includes a threaded socket and locating holes on the face.

3. The camera gimbal according to claim 1, wherein the gearbox includes a face, and wherein the plurality of different mounting structures includes at least one attachment foot included on the face that can be placed in a position extending from the face of the gearbox or in a retracted position.

4. The camera gimbal according to claim 1, wherein the plurality of different mounting structures includes grooves on sides of the gearbox to which mounting hardware may be clamped.

5. The camera gimbal according to claim 1, further comprising a pole or mounting hardware attached to one of the plurality of different mounting structures.

6. The camera gimbal according to claim 1, wherein said clamp member includes an opposed pair of tapered edges and a control knob for permitting adjustment causing the tapered edges to move toward each other or away from each other.

7. The camera gimbal according to claim 6, further comprising a rail member that extends between said opposed pair of tapered edges of the clamp member for being clamped thereto.

8. The camera gimbal according to claim 7, wherein the rail member includes an opposed pair of grooves into which said opposed pair of tapered edges of the clamp member may be engaged.

9. The camera gimbal according to claim 8, said rail member includes an opposed pair of tapered edges and a control knob for permitting adjustment causing the tapered edges to move toward each other or away from each other, said pair of tapered edges of said rail member extending transversely relative to said opposed pair of grooves of said rail member.

10. The camera gimbal according to claim 9, further comprising a mounting plate that extends between said opposed pair of tapered edges of the rail member for being clamped thereto.

11. The camera gimbal according to claim 10, wherein the mounting plate includes an opposed pair of grooves into which said opposed pair of tapered edges of the rail member may be engaged.

12. The camera gimbal according to claim 11, wherein the mounting plate includes a fastener.

13. The camera gimbal according to claim 12, further comprising a camera, smartphone, or camera mounting hardware is connected to said fastener of the mounting plate.

14. The camera gimbal according to claim 13, wherein the rail member may clamp to the mounting plate at any location along a length of the grooves of the mounting plate thereby permitting lateral adjustment of a location the mounting plate to the rail member and enabling a center of gravity of the camera or smartphone with or without mounting hardware to be center balanced relative to the axis of rotation of the camera gimbal.

15. The camera gimbal according to claim 14, wherein the clamp member may clamp to the rail member at any location along a length of the grooves of the rail member thereby permitting adjustment of spacing between a center of gravity of the camera or smartphone with or without mounting hardware to the axis of rotation of the camera gimbal to enable adjustment of rotation speed.

16. The camera gimbal according to claim 1, wherein said gear is secured to said bearing shaft in a fixed-position relative to said bearing shaft and said rotary damper is secured to said gearbox at a fixed-location relative to the gearbox.

17. The camera gimbal according to claim 1, wherein said gear has a periphery with gear teeth and said rotary damper has a periphery with gear teeth, and wherein said gear teeth of said gear are engaged and mesh with the gear teeth of said rotary damper.

18. The camera gimbal according to claim 1, wherein said rotary damper is a hydraulic rotary damper gear.

* * * * *